United States Patent
Sato

(10) Patent No.: US 8,390,535 B2
(45) Date of Patent: *Mar. 5, 2013

(54) STEREO IMAGE DISPLAY DEVICE AND METHOD

(75) Inventor: Shigemi Sato, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 436 days.

This patent is subject to a terminal disclaimer.

(21) Appl. No.: 12/570,895

(22) Filed: Sep. 30, 2009

(65) Prior Publication Data

US 2010/0020162 A1   Jan. 28, 2010

Related U.S. Application Data

(63) Continuation of application No. 11/387,891, filed on Mar. 24, 2006, now Pat. No. 7,623,089.

(30) Foreign Application Priority Data

Mar. 24, 2005   (JP) ................................. 2005-085835

(51) Int. Cl.
  *G02B 27/22* (2006.01)
  *G09G 5/00* (2006.01)
(52) U.S. Cl. .................. 345/8; 349/11; 349/13; 349/15; 359/464
(58) Field of Classification Search .......................... None
See application file for complete search history.

(56) References Cited

U.S. PATENT DOCUMENTS

| | | | |
|---|---|---|---|
| 5,384,593 A | 1/1995 | Gell, Jr. et al. | |
| 5,515,069 A | 5/1996 | Dillon, III | |
| 5,801,667 A | 9/1998 | Shimizu et al. | |
| 5,933,130 A | 8/1999 | Wagner | |
| 6,542,081 B2 | 4/2003 | Torch | |
| 6,570,566 B1 | 5/2003 | Yoshigahara | |
| 6,614,927 B1 | 9/2003 | Tabata | |
| 6,788,274 B2 | 9/2004 | Kakeya | |
| 6,926,429 B2 | 8/2005 | Barlow et al. | |
| 6,996,267 B2 | 2/2006 | Tabata | |
| 7,199,934 B2 * | 4/2007 | Yamasaki | 359/630 |
| 2003/0197933 A1* | 10/2003 | Sudo et al. | 359/464 |
| 2004/0056824 A1* | 3/2004 | Sudo et al. | 345/7 |
| 2004/0056986 A1* | 3/2004 | Blum et al. | 349/13 |
| 2004/0149732 A1 | 8/2004 | Usui et al. | |
| 2005/0116882 A1 | 6/2005 | Yamazaki et al. | |

(Continued)

FOREIGN PATENT DOCUMENTS

JP   A 63-070284   3/1988
JP   A 63-227193   9/1988

(Continued)

OTHER PUBLICATIONS

Dr. Rex's "EYE-vit Program"; http:www.dr-rex.jp/01_02.htm, Dec. 28, 2004.

*Primary Examiner* — Joseph Haley
*Assistant Examiner* — Emily Frank
(74) *Attorney, Agent, or Firm* — Oliff & Berridge, PLC

(57) ABSTRACT

A stereo image display device includes an image display unit for displaying a parallactic image having a right-eye image and a left-eye image on a display plane, a parallactic image selecting unit for making only the right-eye image of the parallactic image reach the right eye of a viewer and making only the left-eye image of the parallactic image reach the left eye of the viewer to thereby make the viewer view a stereo image, an eye fatigue degree detecting unit for detecting the eye fatigue degree of the viewer, and an eye fatigue relaxation processing unit for carrying out eye fatigue relaxation processing for relaxing the eye fatigue of the viewer.

6 Claims, 5 Drawing Sheets

U.S. PATENT DOCUMENTS

| | | | |
|---|---|---|---|
| 2005/0275915 A1 * | 12/2005 | Vesely et al. | 359/13 |
| 2007/0273611 A1 | 11/2007 | Torch | |
| 2009/0243970 A1 * | 10/2009 | Kato et al. | 345/8 |

FOREIGN PATENT DOCUMENTS

| | | |
|---|---|---|
| JP | A 07-234459 | 9/1995 |
| JP | A 08-289327 | 11/1996 |
| JP | A 09-018894 | 1/1997 |
| JP | A 09-023451 | 1/1997 |
| JP | A 11-355808 | 12/1999 |
| JP | A 2003-334211 | 11/2003 |
| JP | A 2004-289527 | 10/2004 |
| JP | A 2004-357760 | 12/2004 |

* cited by examiner

STEREO IMAGE DISPLAY DEVICE AND METHOD

This is a Continuation of application Ser. No. 11/387,891 filed Mar. 24, 2006, which in turn claims priority of Japanese Patent Application No. 2005-085835 filed Mar. 24, 2005.

BACKGROUND

1. Technical Field

The present invention relates to stereo image display device and method.

2. Related Art

An image viewed through the right eye of a human and an image viewed through the left eye of the human are combine with each other in the brain of the human, whereby the human recognizes the viewed object as a stereo image. This is possible because the same object is viewed at different angles (i.e., from different positions) by the right and left eyes and thus the image viewed by the right eye and the image viewed by the left eye are slightly different from each other.

Therefore, in order to make a viewer recognize a two-dimensionally displayed image as a stereo image, a parallactic image comprising an image to be viewed by the right eye (right-eye image) and an image to be viewed by the left eye (left-eye image) is displayed on the two-dimensional plane, and only the right-eye image is made to reach the right eye of the viewer while only the left-eye image is made to reach the left eye of the viewer, whereby the viewer can recognize the two-dimensional parallactic image as a stereo image.

Specifically, a stereo image display device is equipped with an image display unit for displaying a parallactic image on a display plane, and a parallactic image selecting unit for making only the right-eye image of the parallactic image reach the right eye of a viewer and making only the left-eye image of the parallactic image reach the left eye of the viewer. A pair of glasses may be used as the parallactic image selecting unit, for example. The viewer puts on the glasses concerned to thereby recognize a stereo image. As the glasses may be generally used polarized glasses having right-eye and left-eye transmissible portions that transmit therethrough polarized light beams of different polarization directions, or liquid crystal shutter glasses having right-eye and left-eye transmissible portions that are alternately varied between a transmissible state and a non-transmissible state. In the case of use of the polarized glasses, the right-eye image of the parallactic image is set to be based on the polarized light having the polarization direction along which the right-eye transmissible portion transmits light, and the left-eye image of the parallactic image is set to be based on the polarized light having the polarization direction along which the left-eye transmissible portion transmits light, whereby only the right-eye image is made to reach the right eye of the viewer and only the left-eye image is made to reach the left eye of the viewer. Furthermore, in the case of use of the liquid crystal shutter glasses, the right-eye image of the parallactic image is displayed under the state that the right-eye transmissible portion is set to the transmissible state and the left-eye transmissible portion is set to the non-transmissible state, and the left-eye image of the parallactic image is displayed under the state that the right-eye is set to the non-transmissible state and the left-eye transmissible portion is set to the transmissible state, whereby only the right-eye image is made to reach the right eye of the viewer and only the left-eye image is made to reach the left eye of the viewer.

Furthermore, there is known a stereo image display device using a lenticular lens as a parallactic image selecting unit. Specifically, a lenticular lens is disposed on a display plane so that only the right-eye image of a parallactic image displayed on the display plane is guided to the right eye of a viewer, and only the left-eye image of the parallactic image displayed on the display plane is guided to the left eye of the viewer.

The stereo image display devices described above are disclosed in JP-A-63-70284 or JP-A-63-227193, for example.

In the stereo image display devices as described above, a viewer is made to view a stereo image which does not actually exist, and thus the viewer's convergence and the focal point are not coincident with each other, so that the viewer feels uncomfortable and suffers eye fatigue.

Particularly, when the viewer views a stereo image for a long time, a large load is imposed on the viewer's eyes and the eye fatigue is intensified.

SUMMARY

An advantage of some aspects of the invention is to reduce eye fatigue of a viewer when the viewer views a stereo image.

In order to attain the above object, according to a first aspect of the invention, a stereo image display device including an image display unit for displaying a parallactic image having a right-eye image and a left-eye image on a display plane, a parallactic image selecting unit for making only the right-eye image of the parallactic image reach the right eye of a viewer and making only the left-eye image of the parallactic image reach the left eye of the viewer to thereby make the viewer view a stereo image, an eye fatigue degree detecting unit for detecting the eye fatigue degree of the viewer, and an eye fatigue relaxation processing unit for carrying out eye fatigue relaxation processing for relaxing the eye fatigue of the viewer.

According to the stereo image display device of the first aspect of the invention, the eye fatigue degree of the viewer is detected by the eye fatigue degree detecting unit, and the eye fatigue relaxation processing is carried out in accordance with the detection result by the eye fatigue relaxation processing unit.

Therefore, even when the viewer views a stereo image for a long time, the load imposed on the viewer's eyes can be reduced as compared with the stereo image display devices of the related art. Accordingly, the stereo image display device of the first aspect of the invention can reduce the eye fatigue of the viewer when the viewer views a stereo image.

In the above stereo image display device, it is preferable that the eye fatigue degree detecting unit comprises plural image pickup units for picking up images of the viewer, a calculating unit for calculating the distance between the viewer's irises and the distance from the viewer to the display plane on the basis of the image pickup results of the image pickup units, a digitizing unit for digitizing an eye fatigue degree of the viewer per unit time in accordance with the distance between the viewer's irises and the distance from the viewer to the display plane, and an integrating unit for integrating the digitized eye fatigue degree of the viewer per unit time and outputting a start signal of the eye fatigue relaxation processing as the detection result when the integrating result exceeds a predetermined threshold value.

In the stereo image display device described above, it is preferable that the eye fatigue relaxation processing unit may carry out as the eye fatigue relaxation processing the processing of displacing the stereo image viewed by the viewer in a vertical direction to the display plane.

With the above construction, the stereo image is displaced in the vertical direction to the display plane in the eye fatigue relaxation processing, and thus the eye convergence of the viewer can be varied in accordance with the displacement of the stereo image. That is, the viewer can make an eye stretch in the eye fatigue relaxation processing, so that the viewer's eye fatigue when the viewer views the stereo image can be reduced.

Furthermore, in the stereo image display device described above, it is preferable that the eye fatigue relaxing unit is equipped with a display plane displacing unit for displaying the display plane in the depth direction with respect to the viewer, and the eye fatigue relaxation processing contains the processing of displaying the display plane.

With the above construction, the display plane is displaced in the depth direction with respect to the viewer in the eye fatigue relaxation processing, and in connection with this displacement, the focal point of the eyes of the viewer can be varied. That is, the eyes of the viewer can be stretched in the eye fatigue relaxation processing, and the eye fatigue of the viewer can be reduced when a stereo image is viewed.

It is preferable that when the display plane is displaced, the display plane is displaced without varying the size of the stereo image viewed by the viewer. Accordingly, the eye fatigue of the viewer when the viewer views a stereo image can be reduced without varying the size of the stereo image viewed by the viewer.

Furthermore, in the stereo display image described above, it is preferable that the eye fatigue relaxing unit emit an alarm to the viewer in the eye fatigue relaxation processing.

With the above construction, an alarm is emitted to the viewer as the eye fatigue relaxation processing. Therefore, the moderation of the eye fatigue can be promoted to the viewer although it is not directly carried out.

Next, according to another aspect of the present invention, a stereo image display method comprises: displaying a parallactic image comprising a right-eye image and a left-eye image on a display plane; making only the right-eye image of the parallactic image to the right eye of a viewer while making only the left-eye image of the parallactic image to the left eye of the viewer, thereby making the viewer view a stereo image; and detecting an eye fatigue degree of the viewer and relaxing the eye fatigue of the viewer in accordance with the detection result to carry out eye fatigue relaxation processing.

According to the stereo image display method described above, the eye fatigue degree of the viewer is detected, and the eye fatigue relaxation processing is carried out in accordance with the detection result.

Therefore, even when the viewer views a stereo image for a long time, the load imposed on the eyes of the viewer can be reduced as compared with the stereo image display device of the related art. Accordingly, according to the stereo image display method of the aspect of the invention, the eye fatigue of the viewer when the viewer views a stereo image can be reduced.

BRIEF DESCRIPTION FOR THE DRAWINGS

The invention will be described with reference to the accompanying drawings, wherein like numbers reference like elements.

DESCRIPTION OF EXEMPLARY EMBODIMENTS

Figure 1:
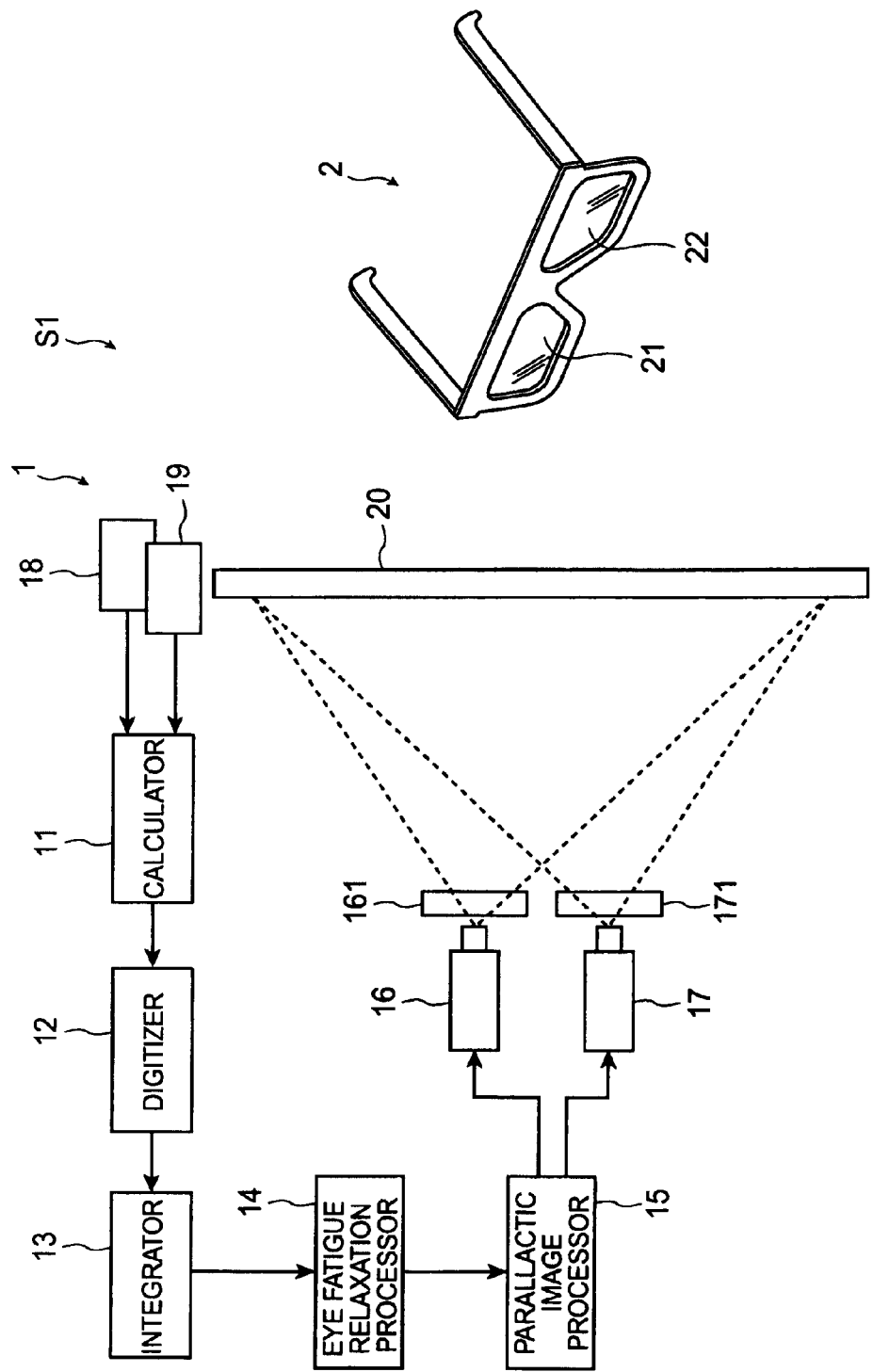
FIG. 1 is a schematic diagram showing a stereo image display device according to a first embodiment of the invention.

Embodiments of stereo image display device and method according to the invention will be described hereunder with reference to the accompanying drawings. In the drawings, the contraction scale of each element is properly changed so that each element is visually recognizable.

First Embodiment

FIG. 1 is a schematic diagram showing the construction of a stereo image display device S1 of a first embodiment. As shown in FIG. 1, the stereo image display device S1 of this embodiment comprises an image display device 1 (image display unit) and glasses 2 (parallactic image selecting unit).

The image display device 1 displays a parallactic image comprising an image for a right eye (right-eye image) and an image for a left eye (left-eye image). This image display device 1 comprises a calculator 11 (calculating unit), a digitizer 12 (digitizing unit), an integrator 13 (integrating unit), an eye fatigue relaxation processor 14 (eye fatigue relaxation processing unit), a parallactic image processor 15, a left-eye image projector 16, a right-eye image projector 17, a first image pickup device 18 (image pickup unit), a second image pickup device 19 (image pickup unit) and a screen 20 (display plane). The first image pickup device 18, the second image pickup device 19 and the screen 20 are disposed so as to face a viewer (the glasses 2).

The first image pickup device 18 and the second image pickup device 19 are arranged in the horizontal direction, and it picks up the image of the viewer and outputs the image pickup result. By picking up the image of the viewer with the two image pickup devices thus arranged horizontally, the images of the viewer which are picked up by the respective image pickup devices 18, 19 are slightly different from each other.

On the basis of the image pickup result of the first image pickup device 18 and the second image pickup device 19, the calculator 11 calculates the distance between the viewer's irises on the image pickup result of the first image pickup device 18 and the second image pickup device 19 and the distance from the viewer to the screen 20. Here, as described above, the first and second image pickup devices 18 and 19 are arranged so as to be slightly displaced from each other in the horizontal direction, and thus the calculator 11 can easily calculate the distance from the viewer to the screen 20 on the basis of the displacement amount of the image pickup result of the image pickup devices 18, 19. Furthermore, the distance between the viewer's irises can be easily achieved by actually measuring the corresponding distance on the image pickup result of the first image pickup device 18 or/and the second image pickup device 19.

The digitizer 12 digitizes the eye fatigue degree per unit time in accordance with the calculation result of the calculator 11, that is, the distance between the viewer's irises and the distance from the viewer to the screen 20.

For example, the distance to the gaze point is uniquely calculated on the basis of the distance between the viewer's irises on the image pickup result of the first image pickup device 18 and the second image pickup device 19 and the distance from the viewer to the screen 20. Accordingly, the digitizer 12 stores the relationship of the distance between the viewer's irises on the image pickup result of the first image pickup device 18 and the second image pickup device 19 and the distance from the viewer to the screen 20 and the gaze point distance in advance and extracts a prescribed gaze point distance from the calculation result of the calculator 11. The gaze point distance means the distance from the viewer to the stereo image viewed by the viewer, that is, the distance from the viewer to the position at which the viewer gazes. The digitizer 12 stores the eye fatigue degree corresponding to the inverse number of each gaze point distance in the form of a numerical value in advance, and on the basis of the calculation result of the calculator 11, the digitizer 12 can calculate the eye fatigue degree of the viewer per unit time as a numerical value (i.e., digitize the eye fatigue degree).

The integrator 13 integrates the digitized viewer's eye fatigue per unit time, and outputs a start signal representing the start of the eye fatigue relaxation processing to the eye fatigue relaxation processor 14 when the integration result exceeds a predetermined threshold value.

In the stereo image display device S1 of this embodiment, the eye fatigue detecting unit comprises the first image pickup device 18, the second image pickup device 19, the calculator 11, the digitizer 12 and the integrator 13. That is, in the stereo image display of this embodiment, the eye fatigue degree of the viewer is detected by the first image pickup device 18, the second image pickup device 19, the calculator 11, the digitizer 12 and the integrator 13 constituting the eye fatigue detecting unit, and when the viewer's eye fatigue degree exceeds the predetermined threshold value, the start signal representing the start of the eye fatigue relaxation processing is output as a detection signal to the eye fatigue relaxation processor 14.

The eye fatigue relaxation processor 14 carries out the eye fatigue relaxation processing for relaxing the eye fatigue of the viewer in accordance with the start signal input from the integrator 13, that is, the detection result of the eye fatigue detecting unit. In this embodiment, the eye fatigue relaxation processing is the processing of displacing the stereo image viewed by the viewer in the vertical direction to the screen 20. Specifically, the signal for the eye fatigue relaxation processing is output to the parallactic image processor 15. On the basis of this signal, the signal of the parallactic image is converted in the parallactic image processor 15 so that the stereo image is displaced in the vertical direction to the screen 20. When the signal is input from the eye fatigue relaxation processor 14 to the parallactic image processor 15, the parallactic image processor 15 converts the signal of a parallactic image input from the external or the signal of a parallactic image stored in advance, and then inputs the parallactic image signal thus converted to the left-eye image projector 16 and the right-eye image projector 17. However, when no signal is input from the eye fatigue relaxation processor 14, the parallactic image processor 15 does not convert the signal of the parallactic image input from the external or the signal of the parallactic image stored in advance, and directly inputs the signal concerned to the left-eye image projector 16 and the right-eye image projector 17.

The left-eye image projector 16 is supplied with the signal of the left-eye image out of the parallactic image signal from the parallactic image processor 15, and projects the left-eye image on the basis of this signal to display the left-eye image on the screen 20.

Furthermore, the right-eye image projector 17 is supplied with the signal of the right-eye image out of the parallactic image signal from the parallactic image processor 15, and projects the right-eye image on the basis of this signal to display the right-eye image on the screen 20.

The three-plate type liquid crystal projector using three liquid crystal light valves as optical modulators may be used as the left-eye image projector 16 and the right-eye image projector 17. Furthermore, a single-plate type liquid crystal projector using a liquid crystal light valve as an optical modulator or a projector using a minute mirror array device may be used.

As shown in FIG. 1, circular polarization plates 161 and 171 are disposed at the subsequent stages of the left-eye and right-eye image projectors 16 and 17, respectively. These circular polarization plates 161 and 171 polarize transmitted light in different rotational directions. In the stereo image display device S1 of the first embodiment, the circular polarization plate 16 disposed at the subsequent stage to the left-eye image projector 16 polarizes the transmitted light to polarized light in a counterclockwise direction when viewed in the direction from the image display device 1 to the glasses 2, and the circular polarization plate 171 disposed at the subsequent stage to the right-eye image projector 17 polarizes the transmitted light to polarized light in a clockwise direction when viewed in the direction from the image display device 1 to the glasses 2.

The viewer puts on the glasses 2, and the glasses 2 have a right-eye transmissible portion 21 for transmitting only image light of the right-eye image out of the parallactic image displayed on the screen 20, and a left-eye transmissible portion 22 for transmitting only image light of the left-eye image out of the parallactic image displayed on the screen 20. The right-eye transmissible portion 21 and the left-eye transmissible portion 22 are disposed so that the right-eye transmissible portion 21 is disposed in front of the right eye of the viewer and the left-eye transmissible portion 22 is disposed in front of the left eye of the viewer when the viewer puts on the glasses 2.

Specifically, the glasses 2 of the stereo image display device S1 of the first embodiment are circular polarization glasses in which the right-eye transmissible portion 21 and the left-eye transmissible portion 22 transmit circularly-polarized light beams different in rotational direction respectively. In the first embodiment, when viewed in the direction from the image display device 1 to the glasses 2, the right-eye transmissible portion 21 transmits only the circularly-polarized light in the clockwise direction, and the left-eye transmissible portion 22 transmits only the circularly-polarized light in the counterclockwise direction.

The rotational direction of the circularly-polarized light is varied by reflection. Therefore, when the image light beams projected from the left-eye image projector 16 and the right-eye image projector 17 are reflected in the image display device 1, the rotational direction of the polarized light transmitted through each of the right-eye transmissible portion 21 and the left-eye transmissible portion 22 is varied in accordance with the reflection frequency. That is, the right-eye transmissible portion 21 and the left-eye transmissible portion 22 are selected so that the image light emitted from the left-eye image projector 16 reaches only the left eye and the image light emitted from the right-eye image projector 17 reaches only the right eye.

Next, the operation of the stereo image display device S1 thus constructed (stereo image display method) of this embodiment will be described.

First, under a normal state, that is, when no start signal is input to the eye fatigue relaxation processor 14 and thus no signal is input from the eye fatigue relaxation processor 14 to the parallactic image processor 15, the signal of the parallactic image input from the external to the parallactic image processor 15 or the signal of the parallactic image stored in the parallactic image processor 15 in advance is divided into the left-eye image signal and the right-eye image signal, and the left-eye and right-eye image signals thus achieved are input to the left-eye image processor and the right-eye image projector 17, respectively.

As a result, the left-eye image is projected from the left-eye image projector 16 onto the screen 20 and the right-eye image is projected from the right-eye image projector 17 onto the screen 20.

Here, the image light of the left-eye image projected from the left-eye image projector 16 onto the screen 20 is polarized to polarized light in the counterclockwise direction through the circular polarization plate 161 when viewed in the direction from the image display device 1 to the glasses 2, and the image light of the right-eye image projected from the right-eye image projector 17 onto the screen 20 is polarized to polarized light in the clockwise direction through the circular polarization plate 171 when viewed in the direction from the image display device 1 to the glasses 2.

In the stereo image display device S1 of this embodiment, the right-eye transmissible portion 21 of the glasses 2 is constructed as a circular polarization plate for transmitting only circularly-polarized light in the clockwise direction when viewed in the direction from the image display device 1 to the glasses 2, and the left-eye transmissible portion 21 of the glasses 2 is constructed as a circular polarization plate for transmitting only circularly-polarized light in the counterclockwise direction when viewed in the direction from the image display device 1 to the glasses 2. Therefore, the right-eye image reaches only the right eye of the viewer, and the left-eye image reaches only the left eye of the viewer. As a result, the brain of the viewer combines the right-eye image and the left-eye image, and the viewer views the stereo image.

In the stereo image display device S1 of this embodiment, when the viewer views the stereo image, the image of the viewer is picked up by the first image pickup device 18 and the second image pickup device 19. This image pickup result is input to the calculator 11. In the calculator 11, the distance between the viewer's irises on the image pickup result of the first image pickup device 18 and the second image pickup device 19 and the distance from the viewer to the screen 20 on the image pickup result are calculated. When the viewer views the stereo image, the viewer puts on the glasses 2. In this case, the right-eye transmissible portion 21 and the left-eye transmissible portion 22 are constructed by polarization plates. Therefore, the distance between the viewer's irises can be checked on the image pickup result of the first image pickup device 18 and the second image pickup device 19.

Subsequently, the calculation result of the calculator 11, that is, the distance between the viewer's irises on the image pickup result and the distance from the viewer to the screen 20 is input to the digitizer 12. The digitizer 12 extracts the gaze point distance from the relationship of the distance between the viewer's irises on the image pickup result and the distance from the viewer to the screen 20 stored in advance and the gaze point distance on the basis of the input calculation result.

Figure 2:
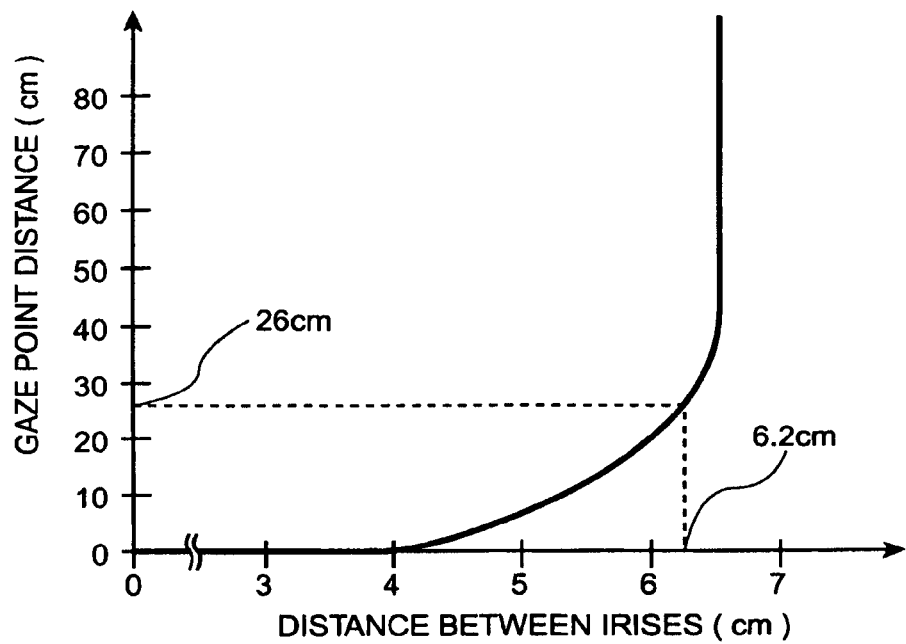
FIG. 2 is a diagram showing the operation of the stereo image display device of the first embodiment of the invention.

For example, when the distance from the viewer to the screen 20 which is based on the input calculation result is equal to 1 m and the relationship between the distance between the viewer's irises on the image pickup result for the distance of 1 m from the viewer to the screen 20 and the gaze point distance is shown in a graph of FIG. 2, if the distance between the viewer's irises on the image pickup result of the input calculation result is equal to 6.2 cm, the calculator 11 calculates the gaze point distance as 26 cm. Thereafter, the digitizer 12 extracts the eye fatigue degree corresponding to the inverse number of the gaze point distance which is digitized and stored in advance. Here, the inverse number of the gaze point distance is used because the relationship between the gaze point distance and the eye fatigue degree is an inversely proportional relationship, that is, the eye fatigue degree is increased as the gaze point distance approaches to zero.

As described above, the eye fatigue degree of the viewer is digitized on the basis of the calculation result of the calculator 11 in the digitizer 12.

The viewer's eye fatigue degree thus digitized is input to the integrator 13. The integrator 13 integrates the viewer's eye fatigue degree thus digitized and input and outputs the start signal to the eye fatigue relaxation processor 14 when the result exceeds a predetermined threshold value.

Figure 3:
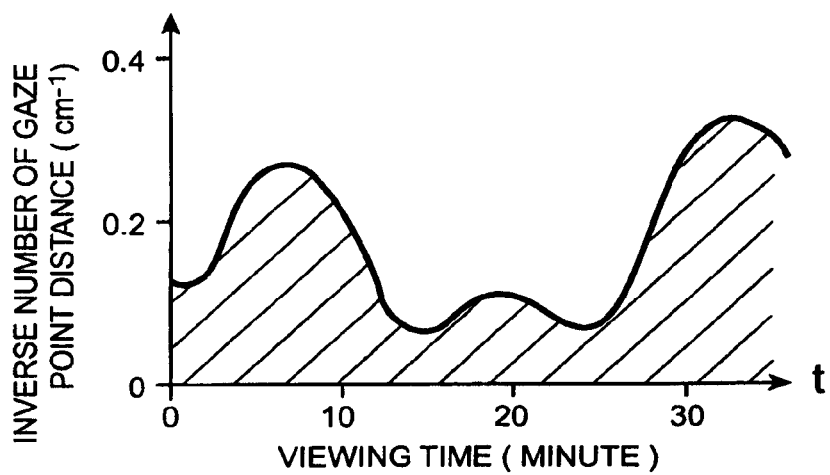
FIG. 3 is a diagram showing the operation of the stereo image display device of the first embodiment of the invention.
Figure 4:
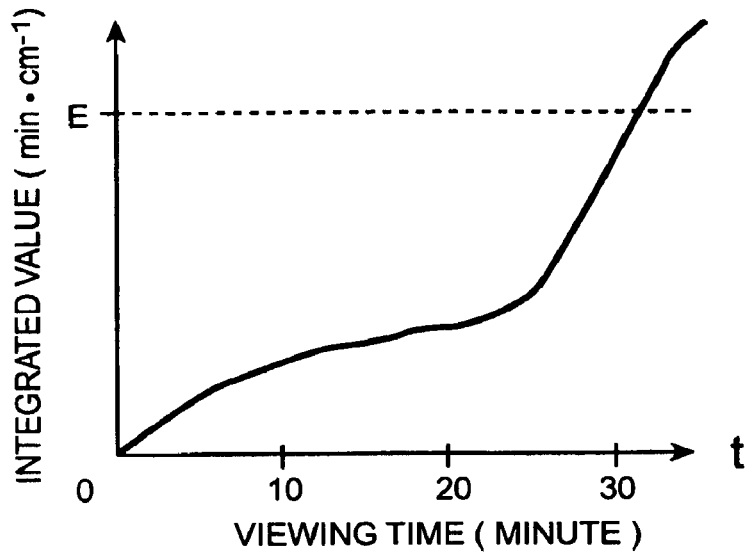
FIG. 4 is a diagram showing the operation of the stereo image display device of the first embodiment of the invention.

For example, the inverse number of the gaze point distance as shown in FIG. 3 varies with the time. That is, when a viewer views a stereo image whose pop amount from the screen 20 varies with the time, the integrator 13 integrates the eye fatigue degree with the time lapse as shown in FIG. 4, and outputs the start signal when the integration result exceeds a threshold value E.

Figure 5:
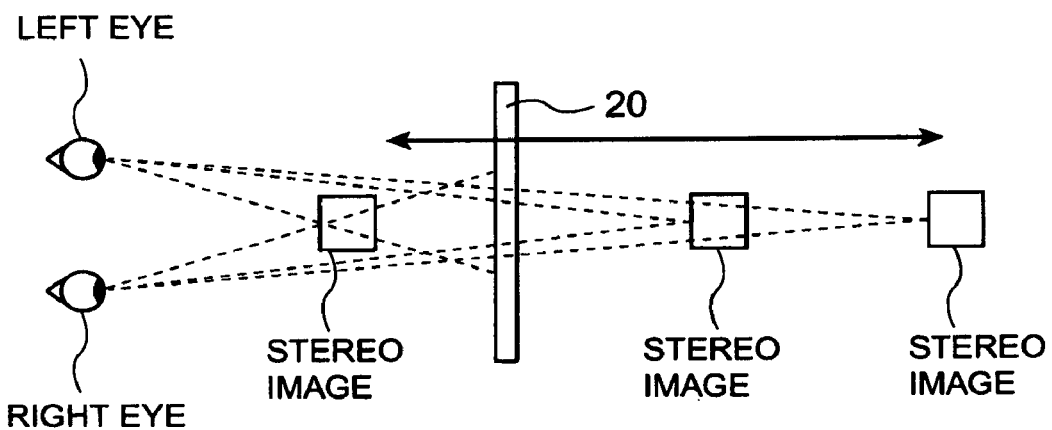
FIG. 5 is a diagram showing the operation of the stereo image display device of the first embodiment of the invention.

The start signal output from the integrator 13 is input to the eye fatigue degree relaxing processor 14. The eye fatigue relaxation processor 14 carries out the eye fatigue relaxation processing in response to the start signal thus input. Specifically, in the stereo image display device S1 of this embodiment, as shown in FIG. 5, the stereo image viewed by the viewer is displaced in the vertical direction to the display plane of the screen 20. More specifically, the signal for converting the parallactic image signal is output to the parallactic image processor 15 so that the stereo image viewed by the viewer is displaced in the vertical direction to the display plane of the screen 20. The parallactic image processor 15 converts the parallactic image signal is converted on the basis of the input signal.

As described above, by displaying the stereo image viewed by the viewer in the vertical direction to the display plane of the screen 20, the convergence angle of the eyes of the viewer is varied, and thus the eye of the viewer is stretched. Accordingly, the eye fatigue of the viewer can be reduced when the viewer views the stereo image.

Second Embodiment

Next, a second embodiment of the invention will be described. In the following description of the second embodiment, the description of the same portion as the first embodiment is omitted or simplified.

Figure 6:
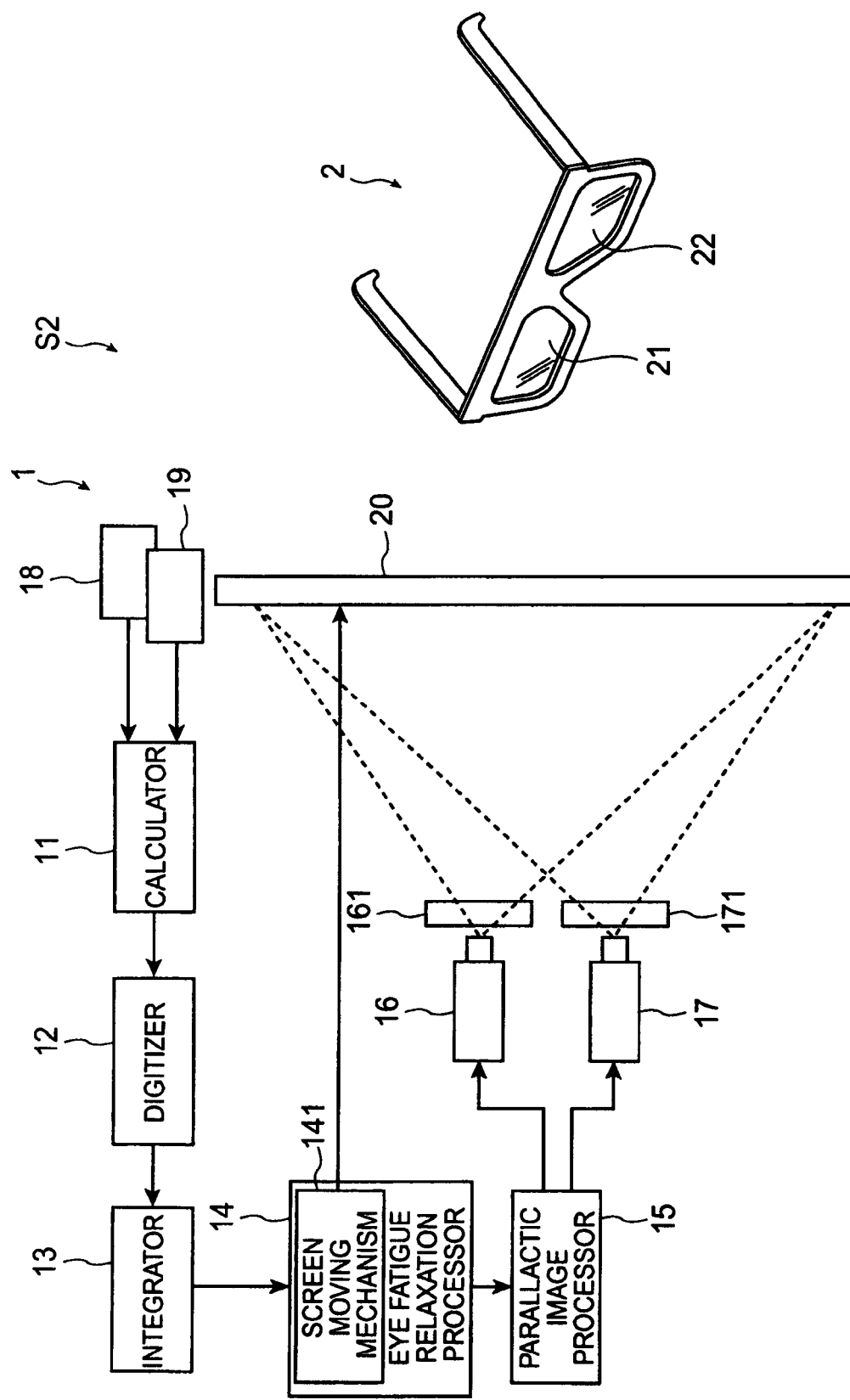
FIG. 6 is a schematic diagram showing a stereo image display device according to a second embodiment of the invention.

FIG. 6 is a schematic diagram showing the construction of a stereo image display device S2 of the second embodiment. As shown in FIG. 6, in the stereo image display device S2 of the second embodiment, the eye fatigue relaxation processor 14 comprises a screen moving mechanism 141 (display plane displacing unit).

The screen moving mechanism 141 moves (displaces) the screen 20 in the depth direction with respect to the viewer.

In the stereo image display device S2 of this embodiment, when the start signal is input to the eye fatigue relaxation processor 14, the eye fatigue relaxation processor 14 moves the screen 20 in the depth direction with respect to the viewer by the screen moving mechanism 141.

By moving the screen 20 in the depth direction with respect to the viewer as described above, the focal length of the eyes of the viewer and the convergence angle of the eyes of the viewer are varied and the eyes of the viewer are stretched. Accordingly, the eye fatigue of the viewer when the viewer views the stereo image can be reduced.

In the stereo image display device S2 of the second embodiment, it is preferable that the parallactic image signal is converted so that the size of the stereo image viewed by the viewer is not varied when the screen 20 is moved. Specifically, when the screen 20 is far away from the viewer, the right-eye image and the left-eye image are greatly varied, and when the screen 20 approaches to the viewer, the right-eye image and the left-eye image are slightly varied, so that the screen 20 can be moved without varying the size of the stereo image viewed by the viewer. In this case, the convergence angle of the eyes of the viewer is not varied, however, the focal length of the eyes of the viewer is varied. Therefore, the eyes of the viewer can be likewise stretched, and the eye fatigue of the viewer when the viewer views the stereo image can be reduced.

Furthermore, in the stereo image display device S2 of the second embodiment, when the parallactic image signal is converted so that the size of the stereo image viewed by the viewer is not varied, it is unnecessary to electrically connect the eye fatigue relaxation processor 14 and the parallactic image processor 15 to each other.

Third Embodiment

Next, a third embodiment of the invention will be described. In the following description of the third embodiment, the description of the same portion as the first embodiment is omitted or simplified.

Figure 7:
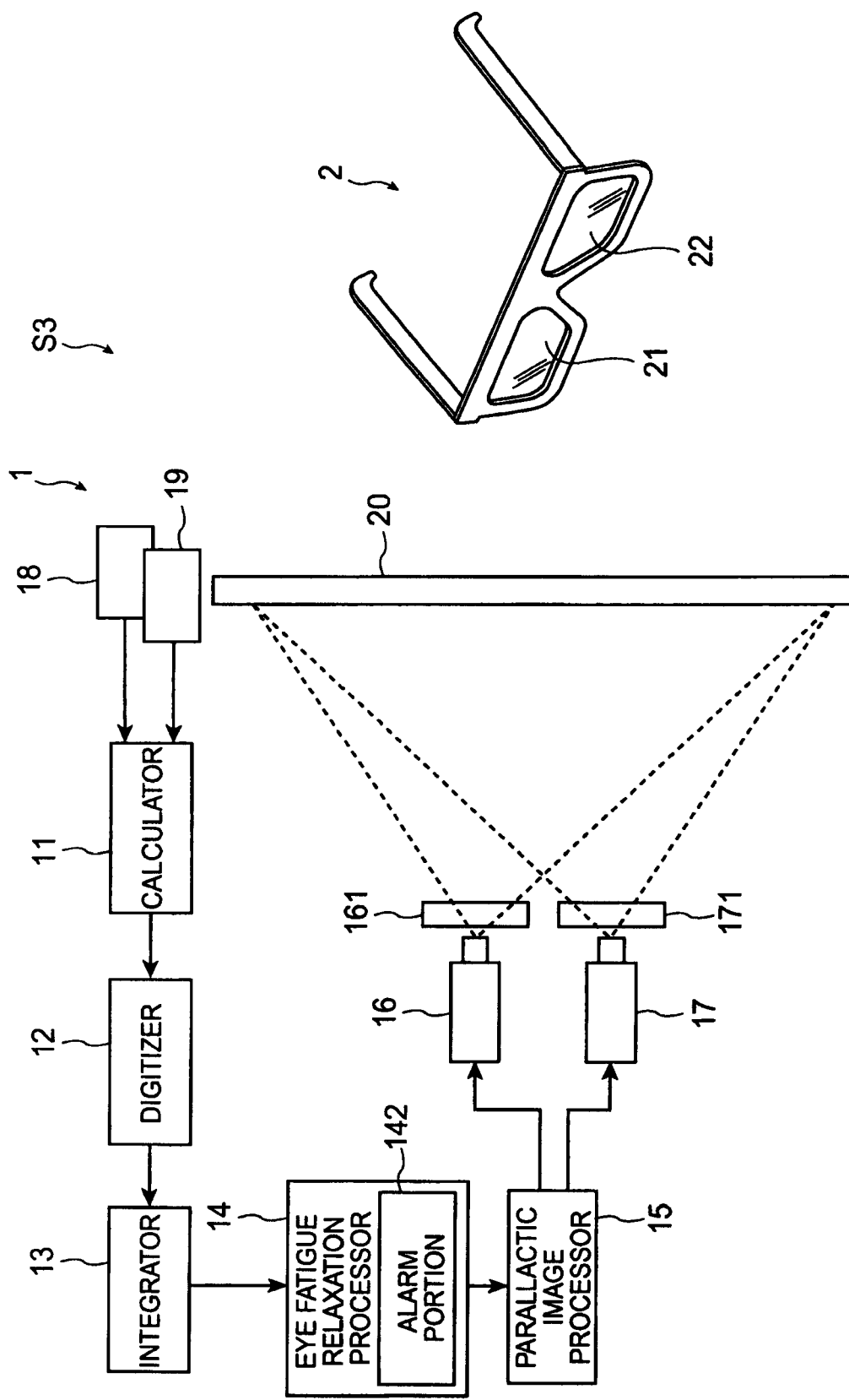
FIG. 7 is a schematic diagram showing a stereo image display device according to a third embodiment of the invention.

FIG. 7 is a diagram showing the construction of a stereo image display device S3 of the third embodiment. As shown in FIG. 7, in the stereo image display device S3 of the third embodiment, the eye fatigue relaxation processor 14 is equipped with an alarm portion 142.

When the start signal is input to the eye fatigue relaxation processor 14, the alarm portion 142 emits an alarm to the viewer. Therefore, an operation of relaxing the eye fatigue (for example, rest or the like) can be promoted to the viewer although it is not direct, so that the eye fatigue of the viewer can be reduced.

The alarm portion 142 may be performed by emitting an alarm or displaying an alarm message on the screen 20.

The embodiments of the stereo image display device and method according to the present invention have been described with reference to the drawings, however, the invention is not limited to the above-described embodiments. The shapes, combinations, etc. of the respective constituent elements of the embodiments described above are examples, and various modifications in design, etc. may be modified without departing from the subject matter of the invention.

For example, in the above embodiments, the stereo image is moved, the screen 20 is moved or the alarm is emitted as the eye fatigue relaxation processing. However, the invention is not limited to these manners. For example, the processing of displaying an image for relaxing the eye fatigue on the screen 20 or the processing of non-displaying the image itself may be carried out as the eye fatigue relaxation processing.

In the above embodiments, the image of the viewer is picked up by the image pickup devices 18 and 19, the distance between the viewer's irises on the image pickup result and the distance from the viewer to the screen 20 are calculated on the basis of the image pickup result, and the eye fatigue degree of the viewer is detected on the basis of the calculation result. However, this invention is not limited to this manner. For example, the eye fatigue degree may be detected from other ecological information, or the eye fatigue degree of the viewer may be detected by judging whether the eye fatigue degree of the viewer exceeds a threshold value when a predetermined time elapses.

Furthermore, in the above embodiments, the polarized glasses 2 using the circular polarization plates as the right-eye transmissible portion 21 and the left-eye transmissible portion 22 are used as the parallactic image selecting unit. However, this invention is not limited to this mode. For example, liquid crystal glasses using liquid crystal shutters as the right-eye transmissible portion 21 and the left-eye transmissible portion 22 may be used as the parallactic image selecting unit. Furthermore, a lenticular lens or the like disposed on the screen 20 may be used as the parallactic image selecting unit. In this case, it is unnecessary for the viewer to put on the glasses, and thus the image of the irises of the viewer can be more clearly picked up by the image pickup devices 18 and 19.

In the above embodiments, the projector is used as the display unit for display an image. However, the invention is not limited to this mode. For example, various kinds of displays such as a CRT, a liquid crystal display device, a plasma display panel, an organic EL display device, an inorganic EL display device, a field emission device, a surface-conduction electron emitter display, etc. may be used.

The entire disclosure of Japanese Patent Application No. 2005-085835, filed Mar. 24, 2005 is expressly incorporated by reference herein.

What is claimed is:

1. A stereo image display method comprising:
    displaying a parallactic image having a right-eye image and a left-eye image on a display plane;
    making only the right-eye image of the parallactic image to the right eye of a viewer while making only the left-eye image of the parallactic image to the left eye of the viewer, thereby making the viewer view a stereo image; and
    initiating an eye fatigue relaxation processing for relaxing the eye fatigue of the viewer while viewing the stereo image when a predetermined time elapses, the predetermined time being greater than zero;
    wherein the eye fatigue relaxation processing step includes displacing the stereo image viewed by the viewer in a perpendicular direction to the display plane.

2. A stereo image display method comprising:
    displaying a parallactic image having a right-eye image and a left-eye image on a display plane;
    making only the right-eye image of the parallactic image to the right eye of a viewer while making only the left-eye image of the parallactic image to the left eye of the viewer, thereby making the viewer view a stereo image; and
    initiating relaxing the eye fatigue of the viewer while viewing the stereo image when a predetermined time elapses, the predetermined time being greater than zero;
    wherein the eye fatigue relaxation processing step includes displacing the display plane in the depth direction with respect to the viewer.

3. The stereo image display method according to claim 2, wherein carrying out the processing of displacing the display plane without varying the size of the stereo image viewed by the viewer.

4. A stereo image display device comprising:

an image display unit configured to display a parallactic image having a right-eye image and a left-eye image on a display plane;

a parallactic image selecting unit configured to make only the right-eye image of the parallactic image reach the right eye of a viewer and to make only the left-eye image of the parallactic image reach the left eye of the viewer to thereby make the viewer view a stereo image; and an eye fatigue relaxation processing unit configured to initiate eye fatigue relaxation processing for relaxing the eye fatigue of the viewer while viewing the stereo image when a predetermined time elapses, the predetermined time being greater than zero;

wherein the eye fatigue relaxation processing unit carries out as the eye fatigue relaxation processing the processing of displacing the stereo image viewed by the viewer in a perpendicular direction to the display plane.

5. A stereo image display device comprising:

an image display unit configured to display a parallactic image having a right-eye image and a left-eye image on a display plane;

a parallactic image selecting unit configured to make only the right-eye image of the parallactic image reach the right eye of a viewer and to make only the left-eye image of the parallactic image reach the left eye of the viewer to thereby make the viewer view a stereo image; and an eye fatigue relaxation processing unit configured to initiate eye fatigue relaxation processing for relaxing the eye fatigue of the viewer while viewing the stereo image when a predetermined time elapses, the predetermined time being greater than zero;

wherein the eye fatigue relaxation processing unit is equipped with a display plane displacing unit configured to displace the display plane in the depth direction with respect to the viewer, and the eye fatigue relaxation processing contains the processing of displacing the display plane.

6. The stereo image display device according to claim 5, wherein the eye fatigue relaxation processing unit carries out the processing that the display plane is displaced without varying the size of the stereo image viewed by the viewer.

* * * * *